United States Patent Office 3,649,424
Patented Mar. 14, 1972

3,649,424
PANELS
Maxwell Alvin Earl Rhiando, "Stonecroft," Friary Road, South Ascot, England
Filed June 30, 1969, Ser. No. 837,720
Claims priority, application Great Britain, July 1, 1968, 31,361/68
Int. Cl. B32b 1/04, 3/06, 7/00
U.S. Cl. 161—43      9 Claims

ABSTRACT OF THE DISCLOSURE

Structural and/or decorative panels of this invention comprise a porous mat impregnated with a composition as herein referred to and overlaid by a layer of a compatible composition, one or more elongated fixing devices being anchored in the composition layer and protruding through the mat for attaching the panel to a reinforcing member. The advantages of panels made in accordance with this invention include moulding the panel in situ with shuttering which affords reinforcement for the panels and overcomes the requirement of expensive moulds.

---

This invention relates to panels, and especially to structural and/or decorative panels.

According to the invention, a panel comprises a porous mat impregnated with a composition overlaid by a layer of the composition, one or more elongated fixing devices being anchored in the composition layer and protruding through the mat for attaching the panel to a reinforcing member.

By a "composition" we mean an organic or inorganic composition which may be applied as a fluid and which subsequently irreversibly sets and hardens. Examples of such compositions are thermosetting resins, cement, and concrete.

The mat may be a fibrous mat of, for example, glass fibres, hessian, or asbestos, or it may comprise expanded metal or metal wire.

A panel according to the invention may be made by covering a layer of a composition in a mould with a porous mat so that the mat absorbs some of the composition by capilliary action and becomes saturated. The composition is then allowed to set and harden. The fixing devices are fitted into the mat before this is applied to the composition layer.

According to one feature of the invention a method of making a panel comprises applying a porous mat to a mould surface having a plurality of holes, inserting fixing devices into the mat so that these are located in the holes, applying a composition to the mat so that the mat becomes impregnated therewith and a layer of the composition remains on the surface of the mat, allowing the composition to set and harden, removing the resulting product from the mould and fixing the product to a plurality of reinforcement members having holes arranged to receive the fixing devices.

A release layer may be provided between the mould surface and the mat if necessary. A surface finish may be applied to the surface of the composition layer before this has hardened. The reinforcement members may comprise a continuous frame.

Alternatively, a mat saturated with a hardened composition and with the fixing devices fitted into it may be placed in a mould and a compatible composition in fluid form spread over the mat so that a layer of the compatible composition remains on its surface, which composition is then allowed to set and harden.

The elongated fixing members may be nails, screw-nails, screws, bolts or staples, and their heads are preferably anchored in the composition layer with their pointed or threaded ends projecting through the mat.

According to a preferred feature of the invention, the panel may be formed integral with two or more reinforcement members which may for example be of wood or metal. The reinforcing members may constitute a mould for the panel.

Accordingly, a method of making a panel may comprise the steps of (1) forming a substantially flat surface by either placing a support between two reinforcement members, or by covering two or more reinforcement with a support;
(2) overlying the surface with a release layer;
(3) overlying the release layer with a porous mat and anchoring the mat to the surface using one or more fixing devices;
(4) applying to the mat a composition in a fluid state so that the mat becomes impregnated with the composition and a layer of the composition remains on the surface of the mat, and
(5) allowing the composition to set and harden.

A large panel made by this method may be formed incorporating door and/or window frames.

Where the support is placed between two reinforcement members in step (1) above, the support may, if desired, be removed after the composition has hardened. The release layer not only assists removal of the support where this is desired, but where its required that the panel or the reinforcing members are used as a unit, the release layer prevents any of the composition from bonding directly to the reinforcing members. The release layer thus enables the reinforcing members to expand or contract independently of the composition layers. The release layer may, for example, comprise a plastics material, for example, cellophane or bituminised paper, or aluminium foil.

The reinforcement members may be separate or they may comprise a frame. They may be set into cement or concrete and the cement or concrete may act as the support during the manufacture and/or use of the panel.

The surface of the composition layer may be decorated with bricks, tiles, powdered or granulated stone, etc. The decorations may be pressed into the composition before it has set. Alternatively, a pattern may be moulded into the composition surface. Louvres, air ducts, pipe outlets, and condensation channels may also be moulded into the surface.

The support may comprise, for example, plywood, wood, cardboard, hardboard, blockboard, chipboard, a rigid foamed plastics material, or plywood faced with a foamed plastics material.

Where the composition is a thermosetting resin this preferably includes a filler such as aluminum silicate, talc, silica, sand, or crushed granite from 16 to 200 mesh, and may include additives such as liquid extenders, pine oil, modified tar or pitch, and lubricating agents such as silicone oils. The resin may be an epoxy resin, a phenolic resin, or a polyester-based material, but is preferably a polyester to which hardening catalyst have been added. The resin may be derived from:

(a) a base resin component consisting of at least 40% by weight of analkyd resin derived from a diol (such as ethylene or propylene glycol) and isophthalic acid and up to 60% by weight of an alkyd resin derived from a diol and orthophthalic acid.

(b) 25 to 35% by weight, based on the weight of the base resin component, of maleic anhydride, (c) a terminally ethylenically-unsaturated monomer, preferably styrene or methyl methacrylate in an amount equivalent to 25 to 35% by weight, based on the weight of the base resin component.

The filler preferably consists of a calcined kaolin (calcined aluminum silicate) in a size range which is substantially all −16 +200 B.S.S. mesh (1.0 mm. to 75 micron nominal aperture) and preferably substantially all −16 +100 B.S.S. mesh.

Alternative resin compositions comprise:

(1) 96% of a polyester, 2% tertiary butyl-ter-2-ethyl hexanoate, and 2% lauroyl peroxide as a hardening catalyst.

This composition may be used filled or unfilled.

(2) 97% polyester, and a hardening catalyst comprising
   2% a ketone peroxide, e.g. methyl/ethyl/ketone peroxide
   1% cobalt naphthenate in styrene
   [½% cobalt metal ]

(3) 97% polyester
   3% a ketone peroxide as a hardening catalyst.

If desired, 2% of tertiary butyl diethyl acetate may be included in (2) above, and 2% 2-4-dichloro benzoyl peroxide may be included in (1), (2) or (3).

In a preferred resin composition the filler comprises 85% 30–100 mesh sand and 8% 100–150 mesh sand. The resin is preferably an orthophthalic resin having a viscosity between 60 and 800 centipoises. The filler to resin ratio for this composition is preferably from 3:1 to 5:1. A hardening catalyst comprising from 4 cc. to 10 cc. of methyl ethyl ketone peroxide and from 4 cc. to 10 cc. of cobalt naphthanate per pound of unfilled resin is preferably included.

Where a filler is included, the ratio of filler to resin may vary for example from 1:1 to 6:1.

The invention will now be described in detail by way of example and with reference to the drawings, in which:

FIGS. 3 to 16 are sectional views of parts of various different panels in accordance with the invention.

Figure 1:
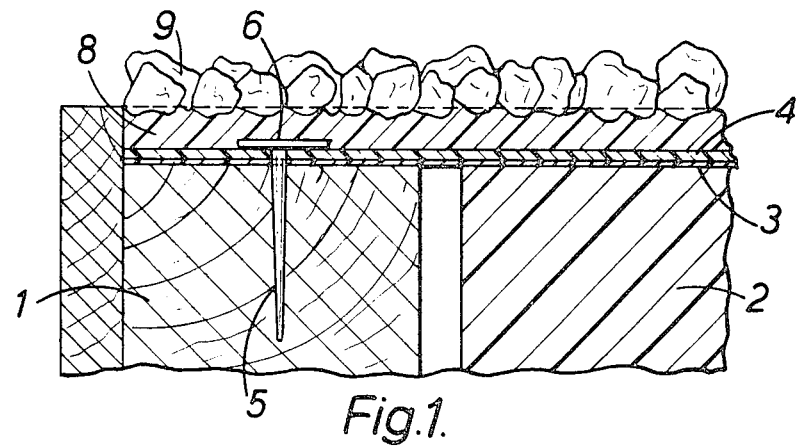
FIG. 1 is a section showing an end portion of a panel during manufacture.

Reffering to FIG. 1, the panel comprises a number of spaced reinforcing members. The supports 2 are the same depth as the reinforcing members 1 so that together these provide a flat surface upon which the panel can be formed. The supports may be fixed temporarily in place, for example with nails, if necessary.

A release layer 3 comprising a film of a plastics material, for example, regenerated cellulose or PVC, is placed over the flat surface provided by the reinforcing members and support 2, and secured around the side of the frame by, for example, tacks or staples. A cellulose film is preferably wetted after being secured so that during drying it shrinks and becomes stretched tightly onto the frame.

A glass fibre chopstrand mat 4 is then laid on top of the film and cut to size. Nails 5 are then driven through the mat 4 and film 3 and into the frame so that their heads 6 protrude slightly from the mat. A temporary shutter or surround 7, for example of timber or metal, is positioned around the frame and fixed above the level of the frame at a height corresponding to the required thickness of the resin layer in the finished panel. A composition comprising an orthophthalic resin thoroughly mixed with catalyst, pigments, filler and other additives is spread evenly over the mat up to the level of the surround, taking care not to disturb the mat. The liquid resin saturates the mat, and the resin layer 8 on top of the mat is preferably ⅛" to ½" thick.

Finally, granite granules 9 are spread evenly over the surface of the resin in a layer one granule thick. The granules sink partly into the resin which is allowed to harden (this may take about 1½ hours) thereby securing the granules in position. The temporary surround 7 and the foamed plastics supports 3 are then removed.

Figure 2:
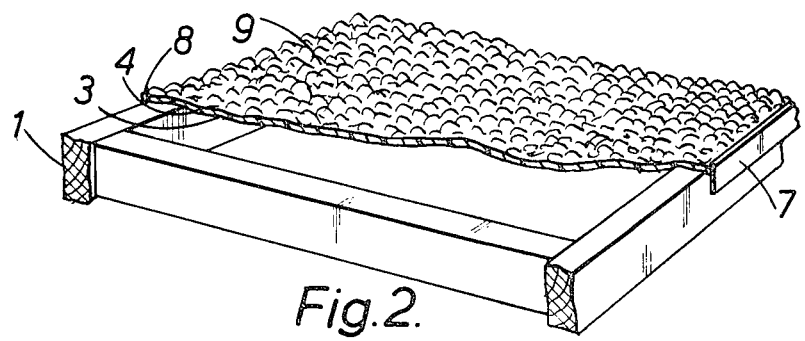
FIGS. 2 and 3 are elevations, partly broken away, of two different finished panels according to the invention.
Figure 3:
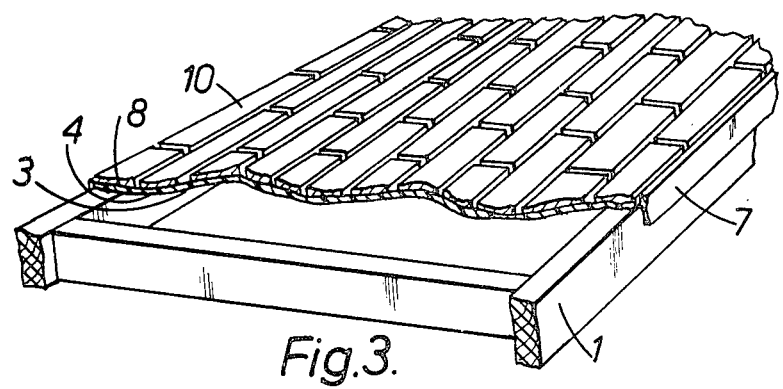
Figure 4:
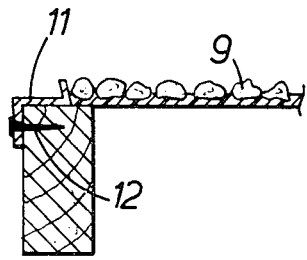
Figure 5:
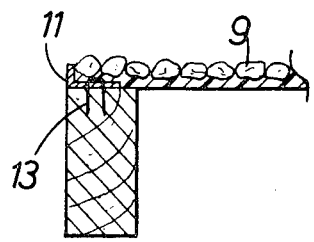
Figure 6:
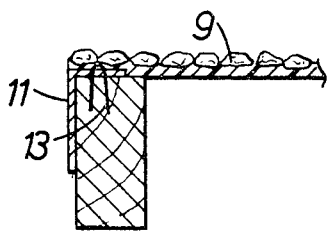
Figure 7:
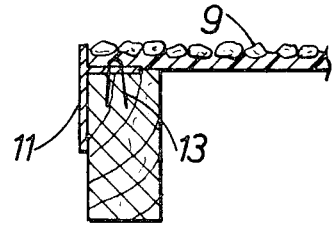
Figure 8:
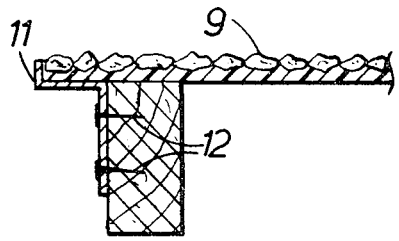

FIG. 2 is a cutaway perspective of the panel of FIG. 1, and FIG. 3 is a cutaway perspective of a panel differing in that the resin surface is decorated with tiles 10 instead of granules. The structure of the panels is not shown in detail in these figures.

Figure 9:
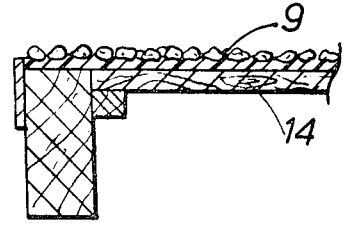

FIGS. 4, 5, 6, 7 and 8 show in section end portions of various panels, each of which incorporates a timber or plastic surround 11 for protecting the edge of the panel and through which one or more nails 12 or staples 13 for anchoring the resin to the reinforcing members passes. This surround could be detachable in the embodiments shown in FIGS. 4, 8 and 9.

Figure 10:
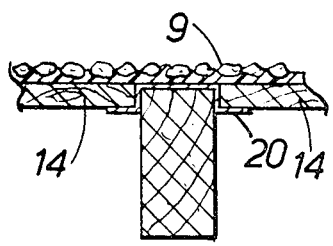
Figure 11:
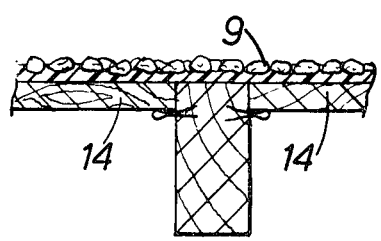
Figure 12:
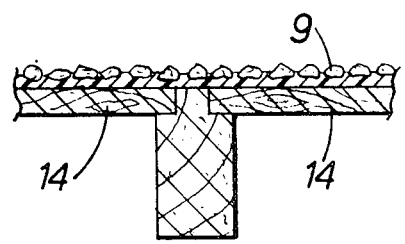
Figure 13:
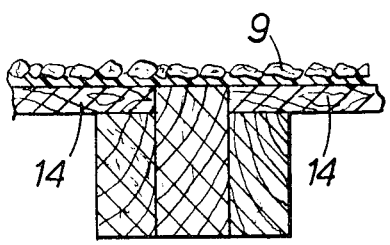
Figure 14:
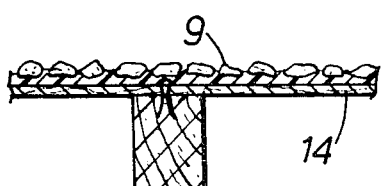

FIGS. 9, 10, 11, 12, 13 and 14 show in section portions of various panels incorporating permanent support 14. These supports are of wood. FIG. 10 shows a metal bracket 20 for holding the support 14 in place. This bracket may be deformed to enable the support to be removed.

Figure 15:
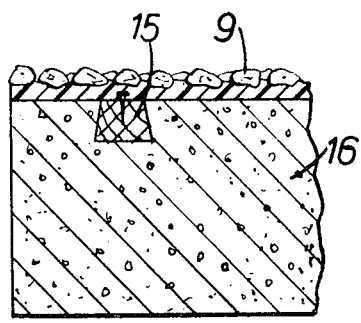

FIG. 15 shows in section part of a panel in which a reinforcing member 15 is set in a block of concrete 16 which also acts as a support for the mat and resin.

Figure 16:
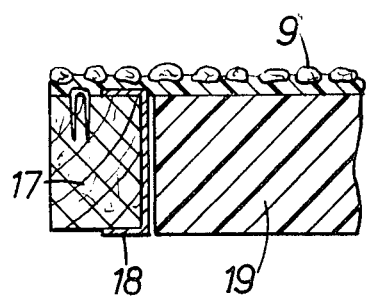

FIG. 16 shows in section part of a panel in which a reinforcing member comprises a wooden beam 17 reinforced by a metal girder 18. The support 19 is detachable.

In all of FIGS. 2 to 16 the structure of the part of the panel comprising the release layer, the mat and the resin layer, although not shown in detail, is similar to that shown in FIG. 1.

I claim:

1. A panel comprising two or more spaced reinforcing members, a release layer overlaying said reinforcing members, a porous mat impregnated with a thermosetting material and overlaid by a composition layer of a thermosetting material, the release layer being overlaid by said mat, elongated fixing members anchored in the composition layer of thermosetting material and extending through the mat and release layer, and into the reinforcing members to provide the only bond between the composition layer and said reinforcing members.

2. A panel according to claim 1 wherein the reinforcing members are joined to form a frame.

3. A panel according to claim 2 wherein the reinforcing members are embedded in cement or concrete.

4. A panel according to claim 3 wherein the reinforcing members are of wood, metal, or a combination of wood and metal.

5. A panel according to claim 1 comprising at least one support between the spaced reinforcement members, the supports and the members forming a flat surface.

6. A panel according to claim 5 wherein the support comprises a concrete base in which the reinforcing members are embedded.

7. A panel according to claim 5 wherein the support comprises wood, plywood, chipboard, hardboard, blockboard, or a rigid plastics foam.

8. A panel according to claim 1 comprising a support between the mat and the reinforcing members.

9. A panel according to claim 1 comprising granular stone, tiles or bricks embedded in the surface of the composition layer.

References Cited

UNITED STATES PATENTS

| | | | |
|---|---|---|---|
| 1,867,897 | 7/1932 | Stanbrough | 52—388 |
| 2,000,409 | 5/1935 | Minutoli | 52—454 X |
| 2,130,911 | 9/1938 | Teunon | 52—315 |
| 2,850,890 | 9/1958 | Rubenstein | 161—192 X |
| 3,142,938 | 8/1964 | Eberhardt | 52—388 X |
| 3,327,442 | 6/1967 | Hermann | 52—388 X |
| 3,340,660 | 9/1967 | Arcari | 52—388 |
| 3,426,490 | 2/1969 | Taylor | 52—388 X |
| 3,435,577 | 4/1969 | O'Leary | 52—454 X |
| 3,521,418 | 7/1970 | Bartoloni | 52—315 X |

JOHN T. GOOLKASIAN, Primary Examiner

J. C. GIL, Assistant Examiner

U.S. Cl. X.R.

52—315; 161—48, DIGEST 4; 264—257